John L. Margrave
Richard J. Lagow
INVENTORS

BY

ATTORNEY

United States Patent Office 3,775,489
Patented Nov. 27, 1973

3,775,489
PROCESS FOR FLUORINATION OF AROMATIC AND POLYNUCLEAR HYDROCARBON COMPOUNDS AND FLUOROCARBONS PRODUCED THEREBY
John L. Margrave, 5012 Tangle Lane, Houston, Tex. 77027, and Richard J. Lagow, Massachusetts Institute of Technology, Department of Chemistry, Room 4–455, Cambridge, Mass. 02139
Continuation-in-part of abandoned application Ser. No. 718,128, Apr. 2, 1968. This application Apr. 14, 1971, Ser. No. 133,803
Int. Cl. C07c 17/00, 19/00, 21/00
U.S. Cl. 260—648 F          19 Claims

ABSTRACT OF THE DISCLOSURE

A process for the direct fluorination of cyclic hydrocarbon compounds, and the production of new perfluoroperhydro derivatives thereof. The cyclic hydrocarbon compound is first placed in a reaction chamber and fluorine gas or an inorganic fluoride gas is introduced into the atmosphere surrounding said compound at a slow rate such that the initial concentration of the fluorinating gas is a mere trace and such concentration is less than 6% at the end of thirty minutes of fluorination. The introduction of the fluorinating gas is then continued at a slow rate to gradually increase the concentration thereof in said atmosphere until the concentration of the fluorinating gas is about 100%. The fluorination process is preferably conducted at atmospheric pressure and room temperature; however, higher temperatures up to the decomposition temperature of the material may be used and in order to increase the amount of fluorination, pressures above atmospheric may be used after a preliminary atmospheric fluorination. New perfluoroperhydro derivatives of cyclic hydrocarbons which have been produced by using this process include perfluoroperhydronaphthacene, perfluoroperhydropentacene, perhydroovalene, perfluoroperhydro - 9,10 - benzaphenanthrene, perfluoroperhydro-1,2-benzanthracene, and perfluoroperhydro-1,3,6,8-tetraphenylpyrene.

CROSS-REFERENCES TO RELATED APPLICATIONS

This application is a continuation-in-part of copending application Ser. No. 718,128, filed Apr. 2, 1968, which application (but not the invention thereof) has been abandoned.

BACKGROUND OF THE INVENTION

(1) Field of the invention

This invention relates to a process for the direct fluorination of cyclic hydrocarbon materials and for controlling the reaction between elemental fluorine and such materials. The use of this process has resulted in the production of new perfluoroperhydro derivatives of cyclic hydrocarbon compounds.

(2) Prior art

It is so widely recognized that it is not a trivial matter to control the reactions of elemental fluorine that, in the synthesis of fluorocarbons and other fluorides, it has been a general practice to avoid the use of elemental fluorine as a fluorinating agent. A very diversified art has been developed utilizing inorganic, metallic, or halogen fluorides, or hydrogen fluoride, in addition processes or in electrolytic cells where no free fluorine is produced.

Direct fluorination has sometimes been attempted on slurries containing the reactant compound in an inert liquid or solid diluent. In most experiments, direct fluorination has previously produced low to mediocre yields which decrease as the molecular complexity becomes greater. In some reactions explosive proportions are reached and large quantities of the most stable saturated fluorides of the elements, such as $CF_4$ and HF in the case of hydrocarbons, are produced.

Fluorine is frequently mentioned with other halogens in connection with halogenation with chlorine, bromine and the like, apparently on the assumption that fluorine would behave similarly to the other halogens. Fluorine is, in fact, quite anomalous and predictions or extrapolations of halogen-dependent properties usually fail for fluorine and its compounds. Fluorine gas molecules have a dissociation energy of only 37.7 kcal/mole, which is substantially lower than either chlorine or bromine and makes the chemistry of fluorine different from these other halogens. An appreciable concentration of reactive fluorine atoms is obtained quite easily in any reaction with a hydrogen-containing material. $F_2$ can extract hydrogen directly from organic systems to yield the very stable HF molecule and leave reactive F-atoms with a low energy of activation for further fluorination, which is a very exothermic process.

More specifically, in regard to the direct fluorination of polynuclear hydrocarbon compounds, i.e. multi-ringed compounds containing at least 10 carbon atoms, most of the previous work has been carried out in the temperature range of 200° C. to 370° C. such that the hydrocarbon compound was in the vapor phase. For instance, see G. H. Cady, A. V. Grosse, E. J. Barber, L. L. Burger and Z. D. Sheldon, Industr. Engr. 39, 290 (1947); R. N. Haszeldine and F. Smith, J. Chem. Soc., p. 2689, 2787 (1950); and E. A. Tyczokowski and L. A. Bigelow, J. Am. Chem. Soc. 77, 3007 (1955). However, the yields, even for the least complex polynuclear hydrocarbon materials, naphthalene and anthracene, were relatively low. Fluorination of many higher molecular weight hydrocarbons were not even attempted due to the difficulty of vaporizing these high-melting compounds.

Partial fluorination of some aromatic and polynuclear organic liquids is disclosed in Wiezevich, U.S. Pat. No. 2,186,916. It is disclosed in this patent that solvents or liquid diluents are used to decrease the violence of the reaction. Furthermore, in the treatment of materials such as naphthalene, the fluorination must be carried out at low temperatures, such as between 0° F. and —70° F.

More recently, Siegart et al., U.S. Pat. No. 3,480,667 (1969), have disclosed the fluorination of certain aromatic and polynuclear compounds at temperatures below 0° C., usually at about —20° C., by using an alkali metal fluoride catalyst. However, the reaction products were telomeric in nature and no perfluoromonomers were indicated as being produced.

Despite the efforts of the art as noted above, many fluorinated cyclic hydrocarbon compounds, especially those containing a relatively large number of carbon atoms, have not previously been produced.

SUMMARY OF THE INVENTION

The primary discovery of this invention is an improved method for the direct fluorination of cyclic hydrocarbon compounds, and for controlling the reaction between fluorine and such materials. By controlling the flow rate of the fluorination gas and the concentration of the gas in the reaction chamber so as to keep the reaction temperature carefully under control, the disadvantages of prior art methods can be obviated, thereby resulting in yields approaching 100% and avoiding telomerization of the aromatic and polynuclear fluorocarbon products. The maintenance of low temperatures and the use of solvents or liquid diluents as required by the prior art can be avoided by the use of the present invention. Neither are any catalysts required.

Another discovery of this invention is the fluorination of many cyclic compounds, which have not previously been fluorinated by other techniques.

Other discoveries, objects and advantages of the present invention will appear in the following description, examples and claims.

The foregoing discoveries of this invention are preferably accomplished by placing the cyclic hydrocarbon material in an enclosed chamber; filling said enclosed chamber with an inert atmosphere; introducing fluorine gas or an inorganic fluoride gas such as $ClF_3$ or $BrF_3$ into the inert atmosphere at a very slow rate and continuing the flow rate of gas into said chamber at a slow rate such that the initial concentration of the fluorination gas is a mere trace and its concentration at such rate will be increased in the reaction chamber to not more than about 6% at the end of 30 minutes. The temperature of the reaction chamber should be maintained below about 100° C. and preferably below 30° C. until the desired degree of fluorination has been achieved. The use of 100° C. temperature is not desirable for most compounds because of the risk of uncontrolled fluorination, and in any event, the fluorination must be conducted below the decomposition temperature of the material being treated.

The process of this invention has utility in the production of monomeric perfluoro-derivatives of aromatic and polynuclear hydrocarbon compounds. These compounds, many of which are new, can be used as solvents for other fluorinated hydrocarbon materials, as solid lubricants, as pigments in paints, or as fillers in hydrocarbon plastics. The fluorination of these hydrocarbon materials substantially increases their oxidation resistance, thermal stability, chemical inertness, solvent resistance and flame retardancy. Moreover, preformed objects made from aromatic hydrocarbons can be fluorinated to increase the thermal stability and chemical inertness of the surfaces of such objects.

BRIEF DESCRIPTION OF THE DRAWINGS

Turning now to the drawings.

DESCRIPTION OF PREFERRED EMBODIMENTS

Figure 1:
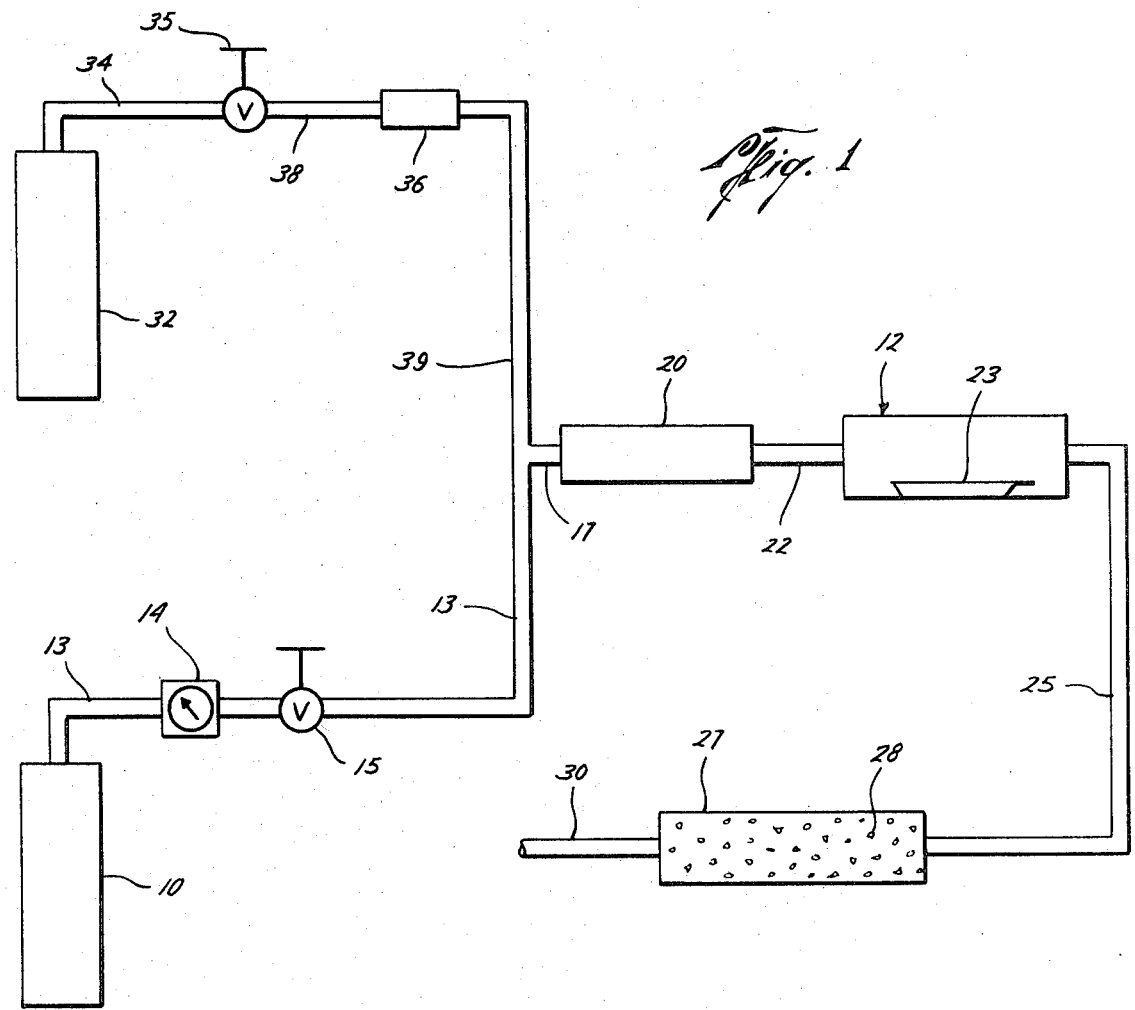
FIG. 1 is a flow of apparatus which may be used in the practice of this invention.

Apparatus suitable for the practice of the flourination process of this invention is illustrated in FIG. 1, in which a suitable source of an inert gas such as cylinder 10 containing helium gas is conducted to the reaction chamber through tubing lines 13 and 17. A flow meter 14 and needle valve 15 are provided in line 13. The gas flow from line 13 is conducted through line 17 and into packed tube 20. In the illustrated apparatus tubes 13 and 17 are one-quarter inch copper tubes and tube 20 is a one-half inch copper tube packed with copper filings. Gas passing through the packed tube 20 is conveyed into the reaction chamber 12 by line 22.

In the illustrated apparatus, reaction chamber 12 is an eighteen inch long, one inch I.D. nickel tube. A sample of the cyclic hydrocarbon compound to be fluorinated is placed in the nickel boat 23 which is in turn placed in the reaction chamber 12. Gases from the reaction chamber are exhausted through line 25, passing through tube 27 containing a charge of granular alumina 28 to remove fluorine gas. The flow of gas from packed tube 27 is exhausted to the atmosphere through line 30.

High purity fluorine gas is supplied from any suitable source such as cylinder 32 containing fluorine gas under pressure which may be obtained from commercial sources at approximately 98% purity. The fluorine gas is conducted through line 34 to the needle control valve 35. The rate of flow of the fluorine gas is measured by conducting the gas through a suitable flow meter 36, such as a Hastings mass flow meter, through line 38. The metered fluorine gas is conducted to the reaction chamber through line 39, line 17, mixer tube 20 and line 22.

Figure 2:
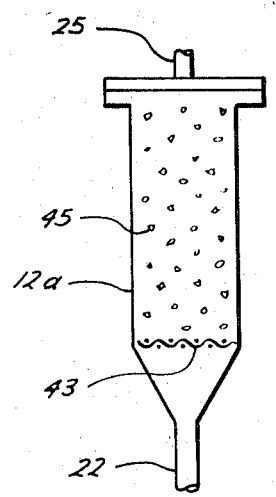
FIG. 2 is a cross-section of a reaction chamber for fluorination of a bed of material.

An alternate reactor chamber 12a is illustrated in FIG. 2 in which a cyclic hydrocarbon compound is supported on a nickel wire cloth screen 43. As illustrated in FIG. 2 the hydrocarbon compound is shown as granular material 45. The reaction chamber may be of any suitable size; however, by way of illustration, a reaction chamber comprising a two inch I.D. tube with an eight inch bed space above screen 43 has been used in practicing the method of the present invention in a laboratory.

Turning now to the process of this invention, a cyclic hydrocarbon material is placed in reaction chamber 12 or 12a in any suitable form such as a powder, shaped object or the like. After the hydrocarbon material has been introduced into the reaction chamber, the flow lines in the reaction chamber are preferably purged by flowing an inert gas, such as helium gas, from cylinder 10 through the reaction chamber for a suitable period of time to substantially reduce the oxygen content of the atmosphere in the reaction chamber. Although the fluorination process can be conducted in an air atmosphere, it is presently preferred that the reaction chamber 12 be purged to avoid any oxygenation of the treated material. It has been found advantageous to carry out the fluorination in the presence of a minimal amount of oxygen to prevent, or at least minimize, the formation of peroxy-species, which can result in thermal instability or color degradation of the fluorinated product.

After purging the reaction chamber 12, if such procedure is followed, fluorine gas or other fluorination gas, is supplied from a suitable source such as high pressure gas cylinder 32. Flow of the fluorination gas is controlled by needle valve 35 and the rate of flow is measured by a flow meter suitable for use with a corrosive gas such as a Hastings mass flow meter. The fluorination gas is conducted through a packed tube 20 which serves as a mixer for the fluorination gas and the air or inert gas in the system. The packed tube also serves as a mixer for any inert gas which may be used to dilute the fluorination gas.

Very low rates of flow are used in the practice of this invention. Within the limits set forth herein, the rate of flow of fluorination gas may be varied as desired, and it is sometimes desirable to start the fluorination process at a flow rate less than the upper limit specified and after a few hours to increase it to approach the upper limit. In a laboratory-scale series of tests, a reaction chamber comprising a one inch I.D. nickel tube eighteen inches long was used with a flow rate of 3 cc. per minute of fluorinating gas. At this flow rate approximately 3% fluorination gas is in the atmosphere of the reaction chamber at the end of thirty minutes; 7% at the end of one hour; and the total amount of fluorine gas at the end of five hours is about 99%. In this apparatus, rates of flow may me used up to about 6 cc. per minute, producing about 6% concentration of fluorination gas at the end of thirty minutes. When the larger reaction chamber 12a is used, rates of flow of about 10 cc. per minute are used to obtain the same slow increase in concentration of fluorination gas to about 3% concentration at the end of thirty minutes. For other reaction chambers of differing sizes the flow rate for the fluorination gas should be such that its concentration will not be more than 6%, preferably about 3%, at the end of thirty minutes, and not more than 14%, preferably about 7%, at the end of one hour of fluorination.

Inorganic fluoride gases, such as $ClF_3$ and $BrF_3$ can be used in the practice of the present invention and they have been shown to be effective reactants, but to a lesser extent than fluorine. In the case of $ClF_3$, the products may contain chlorine as well as fluorine.

When fluorination has proceeded for one to sixteen hours, the fluorinating gas concentration which is initially a mere trace of the total atmospheric pressure in the reaction chamber gradually increases to one atmosphere on the fluorinated product. At the termination of the initial reaction period, the pressure may be raised above atmospheric for greater fluorine penetration and fluorination, or higher pressures may be used to obtain perfluoroperhydro products of higher purity.

As previously noted, it is presently preferred that the air atmosphere in the reaction chamber be at least partially purged before fluorination is begun. An inert gas is suitable for this purpose such as helium, neon, nitrogen or the like. To facilitate temperature control in the reaction chamber, the flow of fluorinating gas may be diluted for highly reactive substances by a constant flow of inert gas such as helium together with the fluorination gas during the first few hours of fluorination. The amount of dilution by inert gas is not critical and may be as little as 10% or less and as high as desired up to about 90%. Higher dilution rates are not often desirable because above 90% dilution the rate of increase in the fluorination gas concentration in the reaction chamber is too slow for practical fluorination. In general, it has been found that the effective control of the rate of fluorination can often be achieved without dilution by maintaining a very low rate of flow of the fluorine gas.

When highly reactive materials are subjected to fluorination, it is important that the temperature of the reaction chamber be maintained below the temperature at which material will char or burn in the fluorine gas. For most cyclic hydrocarbon materials, it has been found that the temperature should be maintained below 100° C. and preferably at room temperature (about 20° C.) or below. For laboratory-scale apparatus, the temperature of the reaction chamber can usually be maintained at about room temperature at the preferred rates of flow of fluorine gas as set forth herein, but it is within the contemplation of this invention to use cooling means such as cooling coils around or within the reaction chamber to maintain the temperature within these limits.

The static reaction step, as presently practiced, is accomplished after the fluorine concentration in the reaction chamber has reached 100% by transferring the treated material to a pressure chamber or bomb and gradually raising the pressure to about 2 or 2½ atmospheres. The amount of increased pressure above atmospheric is not critical and higher pressures could be employed if desired for any reason such as, for example, to obtain deeper fluorination of the surface of solid objects.

Typical of the compounds which can be fluorinated by the process according to this invention are aromatic hydrocarbons such as paradichlorobenzene and polystyrene, and various monomeric polynuclear hydrocarbons including naphthalene, anthracene, naphthacene, pentacene, coronene, decacyclene, ovalene, biphenyl and 9,9′-bifluorene.

By way of further illustration of the invention, but without limiting the scope thereof, the following specific examples demonstrate the practice of the invention with apparatus illustrated in FIGS. 1 and 2.

EXAMPLE 1

One gram of coronene, $C_{24}H_{12}$, was placed in the nickel boat 23 inside the one inch nickel tube 12 at room temperature, and, after purging the reaction chamber for approximately 30 minutes at 8 cc. per minute flow to reduce the oxygen content, fluorine gas at 98% purity was introduced into the reaction chamber at a flow rate of 4 cc. per minute. After ten hours fluorination at this rate, 3 grams of the perfluoro alicyclic derivative of coronene were produced. An analysis of the new perfluoro product revealed 69.5% fluorine and 30% carbon by weight, consistent with the empirical chemical formula $C_{24}F_{36}$ for perfluoroperhydrocoronene.

EXAMPLE 2

One gram of anthracene, $C_{14}H_{10}$, was introduced into reaction chamber 12 as a powdered material in boat 23 and fluorinated by flowing 2 cc. per minute fluorine diluted with 4 cc. per minute helium for three hours at atmospheric pressure and room temperature. Thereafter the helium flow was discontinued and fluorination was continued at 4 cc. per minute fluorine flow for eight hours. The resulting product was the perfluoro alicyclic derivative of anthracene, perfluoroperhydroanthracene ($C_{14}F_{24}$), weighing 2.4 grams. The perfluoro-product had a melting point of 76–81° C.

The following examples were treated in accordance with the procedures hereinabove set forth, using reactor 12 at atmospheric pressure and approximately room temperature.

EXAMPLE 3

Decacyclene, $C_{36}H_{18}$, was fluorinated with fluorine gas at 4 cc. per minute for 9 hours to produce perfluoroperhydrodecacyclene, $C_{36}F_{54}$, a new compound.

EXAMPLE 4

Naphthacene, $C_{18}H_{12}$, was fluorinated with fluorine at 4 cc. per minute for eight hours producing a white powder. The product, which was completely soluble in perfluoro-Decalin, was identified as perfluoroperhydrotetracene, $C_{18}F_{30}$, a new compound.

EXAMPLE 5

Naphthalene, $C_{10}H_8$, was fluorinated at 2 cc. per minute for ten hours to produce perfluoro-Decalin or perfluoroperhydronaphthalene, $C_{10}F_{18}$, a volatile fluorocarbon liquid.

EXAMPLE 6

Pentacene, $C_{22}H_{14}$, was fluorinated at 4 cc. per minute fluorine flow for nine hours to produce a new white compound, perfluoroperhydropentacene, $C_{22}F_{36}$.

EXAMPLE 7

Ovalene, $C_{32}H_{14}$, was fluorinated for nine hours at 4 cc. per minute fluorine flow producing a new white perfluoro compound, perfluoroperhydroovalene, $C_{32}F_{46}$.

EXAMPLE 8

Paradichlorobenzene, $C_6H_4Cl_2$, was fluorinated at a 2 cc. per minute fluorine flow plus a 6 cc. per minute helium flow for 2 hours. The flow was then changed to 2 cc. per minute fluorine and 4 cc. per minute helium and maintained for 12 hours. The volatile products were collected in a cold trap and on analysis the principal product was found to be perfluorocyclohexane, $C_6F_{12}$.

EXAMPLE 9

Polystyrene was fluorinated for eight hours at a 4 cc. per minute fluorine flow, producing a white fluffy powder. In contrast to the parent polystyrene material which melted at 150° F. and burned at 250° F., the perfluoro product melted at 300° F. and decomposed at 400° F.

EXAMPLE 10

9,10-benzaphenanthrene, $C_{18}H_{12}$, was fluorinated with fluorine at 4 cc. per minute for 7 hours. A new white compound, perfluoropherhydro - 9,10 - benzaphenanthrene, $C_{18}F_{30}$, was produced.

EXAMPLE 11

1,2-benzanthracene, $C_{18}H_{12}$, was fluorinated at 4 cc. per minute fluorine flow for 8 hours. A new white compound, perfluoroperhydro - 1,2 - benzathracene, $C_{18}F_{30}$, was produced.

EXAMPLE 12

1,3,6,8-tetraphenylpyrene, $C_{40}H_{26}$, was fluorinated at 4 cc. per minute fluorine flow for 8 hours, producing a new compound, perfluoroperhydro - 1,3,6,8-tetraphenylpyrene, $C_{40}F_{62}$.

After extended fluorination in accordance with this invention, tests of the fluorinated products by infra-red spectra, fluorine and proton NMR spectra, mass spectrometric studies and quantitative analyses indicate above 98% conversion to saturated perfluoroperhydro derivatives. The perfluoroperhydro products prepared in accordance with this invention are somewhat soluble in perfluorobenzene, perfluoro-Decalin and similar fluorocarbon solvents.

It would be obvious to persons skilled in the art that minor variations in the procedures of this invention may be used to produce partially or fully fluorinated products in addition to those specifically set forth herein and that changes and modifications of the invention can be made. Insofar as such variations and modifications incorporate the true spirit of this invention, they are intended to be included within the scope of the appended claims.

We claim as our invention:

1. A process for the production of perfluoroperhydro derivatives of solid cyclic hydrocarbons by direct reaction with fluorine comprising the steps of placing a hydrocarbon material in an enclosed chamber; filling said enclosed chamber with an inert atmosphere; contacting said material with a fluorinating gas selected from the group consisting of fluorine, chlorine trifluoride and bromine trifluoride, said gas being introduced into the inert atmosphere surrounding said hydrocarbon material at a slow rate and continuing the flow of the flourinating gas at the slow rate such that the initial concentration of the fluorinating gas is a mere trace and its concentration in said atmosphere is increased to not more than about 6% at the end of thirty minutes after fluorination has begun, said reaction chamber being maintained below the decomposition temperature of said material throughout said fluorination.

2. The process of claim 1 in which the temperature of said chamber is maintained below about 20° C.

3. The process of claim 2 in which said fluorinating gas introduced into said chamber is diluted with an inert gas in a ratio from about 10% to about 90% inert gas during the initial introduction of fluorinating gas introduced into said chamber is gradually increased during the reaction period until about 100% fluorine gas is introduced.

4. The process of claim 1 in which said fluorinating gas is fluorine.

5. The process of claim 4 in which said fluorinating gas is introduced into said atmosphere at a rate such that the concentration of fluorinating gas at the end of thirty minutes is not more than 3%.

6. The process of claim 1 in which the temperature of said chamber is maintained below 100° C. by controlling the rate of flow of fluorinating gas into the chamber.

7. The process of claim 1 in which said cyclic hydrocarbon material is a polynuclear hydrocarbon material and said fluorination is continued until substantially all hydrogen atoms have been replaced with fluorine atoms.

8. The process of claim 7 in which said polynuclear hydrocarbon material has more than 14 carbon atoms.

9. The process of claim 7 in which said polynuclear hydrocarbon material has more than 20 carbon atoms.

10. The process of claim 1 in which said cyclic hydrocarbon material is an aromatic hydrocarbon and said fluorination is continued until substantially all hydrogen atoms have been replaced with fluorine atoms.

11. The process of claim 10 in which said aromatic hydrocarbon has more than 20 carbon atoms.

12. Perfluoroperhydrocoronene.
13. Perfluoroperhydrodecacyclene.
14. Perfluoroperhydronaphthacene.
15. Perfluoroperhydroovalene.
16. Perfluoroperhydropentacene.
17. Perfluoroperhydro-9,10-benzaphenanthrene.
18. Perfluoroperhydro-1,2-benzanthracene.
19. Perfluoroperhydro-1,3,6,8-tetraphenylpyrene.

References Cited
UNITED STATES PATENTS
2,831,035  4/1958  Tyczkowski et al. ___ 260—653.9

FOREIGN PATENTS
452,656  8/1936  Great Britain _____ 260—653.9

OTHER REFERENCES
Stacey et al.: Advances In Fluorine Chemistry, vol. 1, pp. 22 and 23 (1960), and vol. II, pp. 121 and 126 (1961).

Hudlicky et al.: Chem. of Organic Fluorine Compounds, pp. 74, 75, 76, 77 (1962).

DANIEL D. HORWITZ, Primary Examiner

U.S. Cl. X.R.

260—649 F, 57 R, 239 BC, 314.5, 266

UNITED STATES PATENT OFFICE
CERTIFICATE OF CORRECTION

Patent No. 3,775,489          Dated November 27, 1973

Inventor(s) John L. Margrave and Richard J. Lagow

It is certified that error appears in the above-identified patent and that said Letters Patent are hereby corrected as shown below:

Col. 3, line 15, delete "rate" (first appearance)

Col. 3, line 42, after "flow" add the word -- diagram --

Col. 4, line 55, "me" should be -- be --

Col. 6, line 22, "perfluorohydrotetracene should be
    -- perfluoroperhydronaphthacene --

Col. 6, lines 21 and 22, "perfluoro-Decalin" should be
    -- perfluorodecalin --

Col. 6, line 27, "perfluoro-Decalin" should be
    -- perfluorodecalin --

Col. 7, line 6, "perfluoro-Decalin" should be
    -- perfluorodecalin --

Signed and sealed this 1st day of October 1974.

(SEAL)
Attest:

McCOY M. GIBSON JR.                C. MARSHALL DANN
Attesting Officer                  Commissioner of Patents